United States Patent
Ordentlich et al.

(10) Patent No.: US 8,238,290 B2
(45) Date of Patent: Aug. 7, 2012

(54) COMPRESSING DATA IN A WIRELESS MULTI-HOP NETWORK

(76) Inventors: Erik Ordentlich, San Jose, CA (US);
Gadiel Seroussi, Cupertino, CA (US);
Marcelo Weinberger, San Jose, CA (US); Raul Heman Etkin, San Francisco, CA (US)

( * ) Notice: Subject to any disclaimer, the term of this patent is extended or adjusted under 35 U.S.C. 154(b) by 267 days.

(21) Appl. No.: 12/792,515

(22) Filed: Jun. 2, 2010

(65) Prior Publication Data

US 2011/0299455 A1    Dec. 8, 2011

(51) Int. Cl.
*H04W 40/00* (2009.01)
(52) U.S. Cl. .............. 370/328; 709/247; 375/240
(58) Field of Classification Search .............. 370/328, 370/338, 537; 375/240; 709/247
See application file for complete search history.

(56) References Cited

U.S. PATENT DOCUMENTS

| | | |
|---|---|---|
| 2006/0167634 A1 | 7/2006 | Cho |
| 2007/0079223 A1 | 4/2007 | Mondin |
| 2009/0089446 A1* | 4/2009 | Ebling et al. .......... 709/231 |
| 2009/0254869 A1* | 10/2009 | Ludwig et al. ......... 715/863 |
| 2010/0074157 A1* | 3/2010 | Doh et al. ............ 370/311 |
| 2010/0090823 A1* | 4/2010 | Park et al. .......... 340/539.1 |
| 2011/0161627 A1* | 6/2011 | Song et al. ............ 712/30 |
| 2011/0222438 A1* | 9/2011 | Wang ................. 370/255 |

OTHER PUBLICATIONS

Tang, et al. An Energy Efficient Adaptive Distributed Source Coding Scheme in Wireless Sensor Networks. 0-7803-7802-4/03/$17.00. 2003 IEEE.
Lotfinezhad, et al. Effect of Partially Correlated Data on Clustering in Wireless Sensor Networks. 0-7803-8796-1/04/$20.00. 2004. IEEE.

\* cited by examiner

*Primary Examiner* — Brian D Nguyen

(57) ABSTRACT

A first node receives aggregated compressed data and unaggregated data from a second node in a wireless multi-hop network. The first node compresses its own collected data based on the received unaggregated data. The first node aggregates its own compressed data with the aggregated compressed data received from the second node. The first node forwards an unaggregated version of its own collected data along with aggregated compressed data to a next hop in the wireless multi-hop network.

11 Claims, 3 Drawing Sheets

COMPRESSING DATA IN A WIRELESS MULTI-HOP NETWORK

BACKGROUND

Data compression is the process of encoding information using fewer bits (or other information-bearing units) than an unencoded representation of the information would have, through the use of specific encoding schemes. Data compression can be burdensome in various power-constrained applications, including in wireless networks.

BRIEF DESCRIPTION OF DRAWINGS

The following description includes discussion of figures having illustrations given by way of example of implementations of embodiments of the invention.

DETAILED DESCRIPTION

Figure 1:
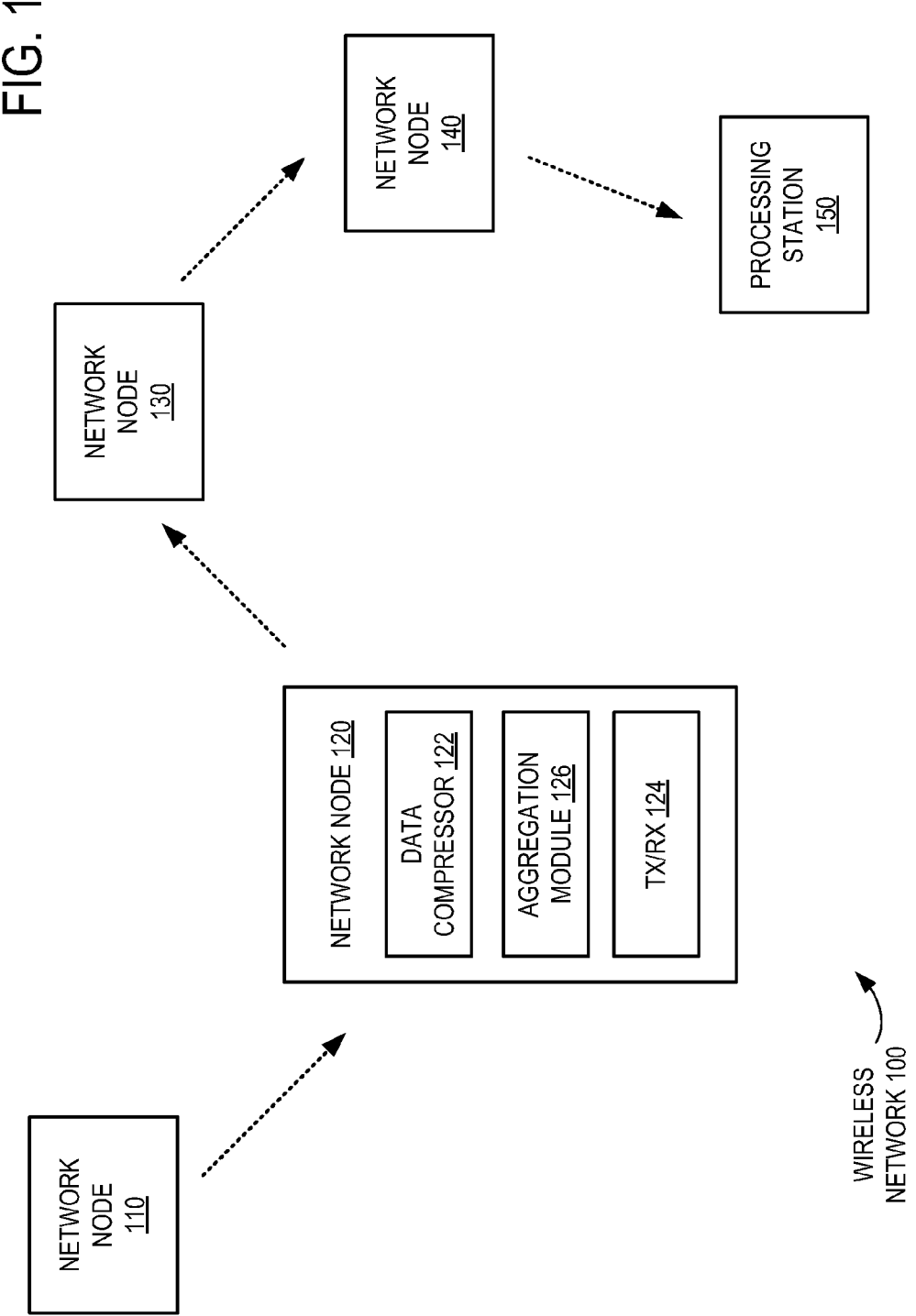
FIG. 1 is a block diagram illustrating a system according to various embodiments.

As used herein, a sensor network refers to a network of nodes in which at least some of the nodes collect sensor data. In many situations, a plurality, majority or even all of the nodes in a sensor network collect sensor data. Sensor data may include external sensor data obtained by measuring and/or detecting natural phenomena such as temperature, sound, wind, seismic activity or the like. Sensor data may also include external sensor data obtained by measuring/detecting man-made phenomena such as light, sound, various frequency spectrum signals, etc. Sensor data may alternatively include data related to measuring/detecting phenomena internal to a sensor node (e.g., traffic flow on a network, etc.).

In sensor network applications it is often desirable for sensor nodes to compress and forward sensed data in a multi-hop fashion to a central aggregation point (or a few central aggregation points). In many applications, the data sensed by each node is correlated (e.g., has statistical dependencies) across nodes and it may be advantageous to compress the acquired data differentially with respect to the data arriving from upstream neighboring nodes in the multi-hop routing graph.

Certain differential compression techniques, such as those used in image compression, involve decompressing aggregated compressed data at each node to recover the data corresponding to neighboring nodes and then using this decompressed data as the basis for predictive or differential compression. This decompression step may place an undue power consumption burden on the sensor nodes, particularly those closer to any central aggregation points, as the amount of aggregated compressed data needing to be decompressed grows with each hop.

In various embodiments described herein, aggregated compressed data being forwarded along a multi-hop chain is augmented at each hop with unaggregated data from relevant neighboring nodes. The unaggregated data is formed by processing data collected at these neighboring nodes only (e.g., raw uncompressed data from such nodes, data "lightly" compressed without conditioning on data from other nodes, etc.). The downstream node receiving the forwarded data uses the unaggregated data from its upstream neighbors to compress (e.g., differentially, predictively, etc.) its own data and add it to the aggregated compressed data. The downstream node can then continue the forwarding of aggregated data downstream, along with its own data in unaggregated form (either uncompressed or compressed), so that the process may be repeated at the next hop in the network. In this way, compression (e.g., differential compression) is accomplished without decompressing the aggregated compressed data just to obtain the uncompressed data from neighboring nodes or a function of it, which is obtained from the unaggregated data. This results in reduced computation and power consumption relative to conventional approaches. In particular, it should be noted that as the size of the aggregated compressed data grows with each hop, the cost of forwarding unaggregated data from neighboring nodes becomes less significant. Although the size of the unaggregated data may vary from node to node, it will generally not grow monotonically in size with the number of hops, as the aggregated data will generally do.

FIG. 1 is a block diagram illustrating a system including a plurality of network nodes according to various embodiments. While embodiments described herein could be implemented in any type of network, including wired networks, wireless networks offer a good discussion example given that wireless networks—and, in particular, wireless nodes—are frequently constrained by power limitations. Wireless network 100 illustrates a multi-hop network and includes network nodes 110-140. While network nodes 110-140 are illustrated as wireless nodes, it is not necessary that all nodes in network 100 be wireless. In other words, network 100 could be a combination of wired and wireless nodes in some embodiments. Node 120 is illustrated in more detail than nodes 110, 130 and 140 for purposes of clarity and convenience, not to suggest any physical differences between the nodes, although differences may exist between nodes in certain embodiments.

Node 120 includes a transmitter/receiver 124 that receives aggregated compressed data and unaggregated data from a neighbor node (e.g., node 110), with provisions to allow easy separation of the unaggregated data from the aggregated compressed data. The unaggregated data is formed by processing data collected at the neighbor node, and it may be uncompressed data or compressed data. If the unaggregated data is compressed, it may be lightly compressed, independently of data from other nodes. In various embodiments, data (compressed and uncompressed) includes sensor data sensed by sensors integrated with and/or communicatively connected to nodes 110-140. Sensor data may include external sensor data obtained by measuring/detecting natural phenomena such as temperature, light, sound, wind, seismic activity or the like. Sensor data may also include external sensor data obtained by measuring/detecting similar man-made phenomena such as temperature, light, sound, various frequency spectrum signals, etc. Sensor data may alternatively include data related to measuring/detecting activity internal to a sensor node (e.g., traffic flow on a network, etc.).

Aggregated compressed data received by node 120 is not limited to data compressed using a particular compression technique. Compression may be lossy (e.g., quantized transform coding, etc.) or lossless (e.g., entropy encoding, Huffman coding, Slepian-Wolf coding, etc.) in different embodiments. In embodiments that use state-dependent entropy coders, such as an arithmetic coder, additional encoder state information from one or more registers (e.g., located on node 110) may be received with the compressed data. Unaggregated data (e.g., received from one or more neighboring nodes) is used by data compressor 122 to compress data sensed and/or collected at node 120. For example, it may be used to recover the uncompressed data from the neighboring nodes to build a model of statistical dependence between data samples from different node locations. Such a model is then used to generate an estimate (e.g., an average value, etc.) of the data sensed and/or collected at node 120. The estimate may then serve as a basis for differentially compressing the data sensed and/or collected at node 120.

Aggregation module 126 aggregates compressed data sensed and/or collected by node 120 with the aggregated compressed data received from the upstream node (e.g., node 110). Aggregation module 126, along with other node components described in different embodiments, may be implemented as one or more software modules, hardware modules, special-purpose hardware (e.g., application specific hardware, application specific integrated circuits (ASICs), embedded controllers, hardwired circuitry, etc.), or some combination of these.

For example, aggregation module 126 could aggregate compressed data into packet payloads that share a common packet header. Transmitter 124 forwards the aggregated compressed data to a next hop in the network (e.g., node 130), along with an unaggregated version of the data sensed and/or collected by node 120. By transmitting the unaggregated data with the aggregated compressed data, the next hop can compress its own data without the need for any decoding of the aggregated compressed data. This process continues from node to node, next hop to next hop, until aggregated compressed data is received at processing station 150. Processing station 150 decompresses and/or decodes the aggregated compressed data to be stored and/or used in various applications. Given that processing station 150 decompresses the aggregated compressed data, node 140 may, in various embodiments, forward the aggregated compressed data without also forwarding any unaggregated data.

Figure 2:
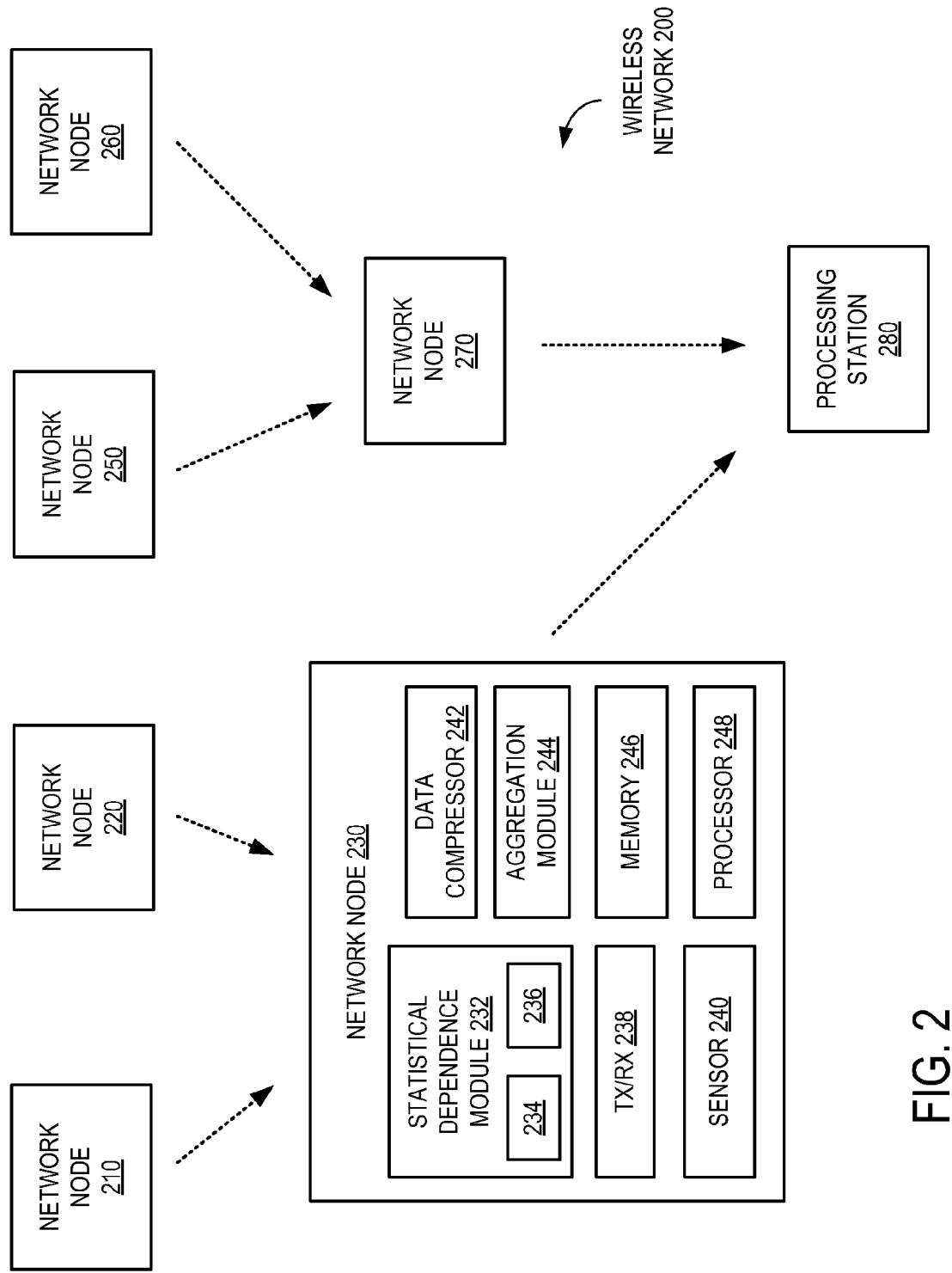
FIG. 2 is a block diagram illustrating a system according to various embodiments.

FIG. 2 is a block diagram illustrating a system including network nodes according to various embodiments. Whereas network 100 of FIG. 1 illustrates a single-chain multi-hop network, network 200 illustrates an example of a tree-structure network that may be used in various embodiments. The concept of aggregating compressed data and forwarding both aggregated compressed data and unaggregated data applies to the tree-structure of FIG. 2 in similar fashion as it applies to the single-chain structure of network 100. While the tree-structure is an example of a multi-dimensional network, mesh networks and other multi-dimensional network structures could also be used Node 230 is illustrated in more detail than nodes 210, 220 and 250-270 for purposes of clarity and convenience and not to suggest any physical differences between the nodes, although differences may exist between nodes in certain embodiments. Node 230 includes a receiver 238 that receives both aggregated compressed data and unaggregated data (e.g., uncompressed data) from neighbor nodes 210 and 220. In various embodiments, data (compressed and uncompressed) includes sensor data sensed by sensors integrated with and/or communicatively connected to nodes 210-270. Sensor data may include external sensor data obtained by measuring/detecting natural phenomena such as temperature, light, sound, wind, seismic activity or the like. Sensor data may also include external sensor data obtained by measuring/detecting similar man-made phenomena such as temperature, light, sound, various frequency spectrum signals, etc. Sensor data may alternatively include data related to measuring/detecting activity internal to a sensor node (e.g., traffic flow on a network, etc.).

Aggregated compressed data received by node 230 is not limited to data compressed using a particular compression technique. Compression may be lossy (e.g., quantized transform coding, etc.) or lossless (e.g., entropy encoding, Slepian-Wolf coding, etc.) in different embodiments. Unaggregated data (e.g., received from nodes 210 and/or 220) is used by data compressor 242 as a basis for compressing data sensed and/or collected by sensor 240 at node 230. The unaggregated data may be in uncompressed form, a "lightly" compressed form, or other compressed form that is easily used for this purpose.

For example, an estimate (e.g., an average value, etc.) of the data sensed and/or collected by sensor 240 may be generated from the received unaggregated data and used as a basis for differentially compressing the data sensed and/or collected by sensor 240.

More particularly, statistical dependence module 232 builds and/or creates a model of statistical dependencies between sensor data samples from one particular node (e.g., at different times) or between sensor data samples from different nodes (e.g., at the same time). The unaggregated data may be received in uncompressed form, or may be easily brought to uncompressed form, and may be used to build one or more statistical models. In various embodiments, to compress sample i collected by node 230, the statistical model may include dependencies with respect to the i-1 and i-2 samples of node 230 (temporal dependencies). The statistical model might also include (or alternatively include) dependency with respect to sample i of node 210 and/or node 220 (spatial dependencies). The statistical model may consist of a conditional probability distribution $P(X_i|X_{i-1}, X_{i-2}, Y_i)$, where $X_j$ denotes the sample j collected by node 230, and $Y_i$ denotes the sample i collected by node 210. Accordingly, statistical dependence module 232 includes a temporal dependence module 234 to model temporal dependencies (e.g., time when data is sensed, etc.) and a spatial dependence module 236 to model spatial dependencies in sampled data. Temporal dependence module 234 and spatial dependence module 236 are merely examples of modules that model statistical dependencies. Other modules could be used to generate different models that exploit other dependencies, either in the same sensor or across sensors.

Data compression module 242 encodes the data sequence $X_i$ based on the statistical model using an entropy coder matched to the conditional probability distribution $P(X_i|X_{i-1}, X_{i-2}, Y_i)$. In various embodiments, the entropy coder might implement a Huffman code or an arithmetic code. In another embodiment, statistical dependence module 232 may generate an estimate $X_i'$ of $X_i$ as a function of $X_{i-1}$, $X_{i-2}$, and $Y_i$ and a probability distribution $P'(X_i-X_i')$, and the entropy coder of compression module 242 may be matched to this probability distribution. In yet another embodiment, data compression module 242 may code the difference $X_i-X_i'$ with a Golomb code.

In an example, nodes 210-230 collect integer-valued temperature data. During a time period, node 210 collects samples of 70° F. and 72° F. (samples i-1 and i), node 220 collects samples of 71° F. and 71° F. during the same time period, and node 230 collects a sample of 74° F. at time i-1. In such case, statistical dependence module 232 might generate an estimate (e.g., an average) of 72° F. for the data sample collected by node 230 at time i (based on the sample of 74° F. collected at time i-1 and/or the samples of 72° F. collected by node 210 and 71° F. collected by node 220 at time i). Accordingly, if node 230 collects a sample of 70° F. (e.g., soon after the time period), then the estimate of 72° F. can be used to differentially compress the 70° F. sample from node 230. Thus, rather than compressing "70", node 230 compresses the difference between 70° F. and the estimate (72° F.), requiring a smaller number of bits with the use of a suitable code (e.g., Golomb code).

In various embodiments, sensor data is tagged with metadata such as timestamps, geo-tags and/or other information that may be used to facilitate temporal and/or spatial dependency modeling.

Aggregation module 244 aggregates compressed data sensed and/or collected by node 230 with the aggregated compressed data received from nodes 210 and 220. Using Golomb coding as an example, compressor 242 generates a Golomb codeword based on the difference between a data sample collected at node 230 and an estimate of that data sample (e.g., based on previous samples and/or unaggregated data received from nodes 210 and/or 220). Aggregation module 244 appends the Golomb codeword to the aggregated compressed data received from nodes 210 and/or 220. It then transfers the aggregated data and, separately, the unaggregated data (e.g., uncompressed or lightly compressed) from node 230 to the transmitter 238. This process could be done sample by sample (e.g., the appended compressed sensed data is a single codeword for a sample) or by encoding multiple sensed samples at a time, where the appended compressed sensed data corresponds to multiple codewords. Other suitable coding schemes could also be used in different embodiments.

In embodiments that employ state-dependent entropy coding, such as arithmetic coding, aggregation module 244 may terminate the compressed sensed data bit stream so that it can be decoded regardless of any additional bits that may be appended. The terminated compressed sensed data bit stream is then appended to the aggregated data (and forwarded to the next node).

Alternatively, only the portions of the compressed sensed data bit stream that are determined to be unalterable by further coding operations may be appended to the aggregated compressed data. In such a case, aggregation module 244 encodes and appends encoder state information to allow a next node (e.g., network node 270) to extend the compressed bit stream via additional coding operations for compressing its own sensed data. This technique may also be used more generally to avoid the overhead (e.g., extra bits) associated with bit stream termination.

It should be noted that aggregation module 244, along with other node components (e.g., statistical dependence module 232, etc.) described in different embodiments, may be implemented as one or more software modules, hardware modules, special-purpose hardware (e.g., application specific hardware, application specific integrated circuits (ASICs), embedded controllers, hardwired circuitry, etc.), or some combination of these. Additionally, various functions and operations of described embodiments may be implemented as instructions executable by a processor (e.g., processor 248) and stored on a computer-readable storage medium (e.g., memory 246). In various embodiments, data collected by sensor 240 and/or data received via receiver 238 may be stored in memory 246.

Once local sensor data has been compressed and aggregated with received compressed data, transmitter 238 forwards the aggregated compressed data to processing station 280. If node 230 were to forward data to a different node, the forwarded data may include unaggregated data collected by sensor 240 to be used by the next node for its own compression purposes. Transmitter 238 can transmit data in a way that allows a next node to separate the compressed aggregated data from the unaggregated sensed data. For example, transmitter 238 may reserve a predetermined number of bits in a predetermined position in the forwarded data for the unaggregated sensed data. Or, transmitter 238 could use markers (e.g., sequences of bits such as a string of 1's that occur nowhere else in the aggregated data) to signal the transition from compressed aggregated data to unaggregated (e.g., uncompressed) sensed data. In yet another example, transmitter 238 could include bit stream segment length data with the compressed data to signal a transition between aggregated compressed and unaggregated data.

It is unnecessary for transmitter 238 to forward unaggregated data when transmitting to processing station 280 as opposed to another sensor node given that processing station 280 has no sensed data of its own to be compressed in view of unaggregated data. After decoding the received data, processing station 280 may store the data in a memory and/or perform further processing operations to analyze, process, or otherwise manipulate the data.

Figure 3:
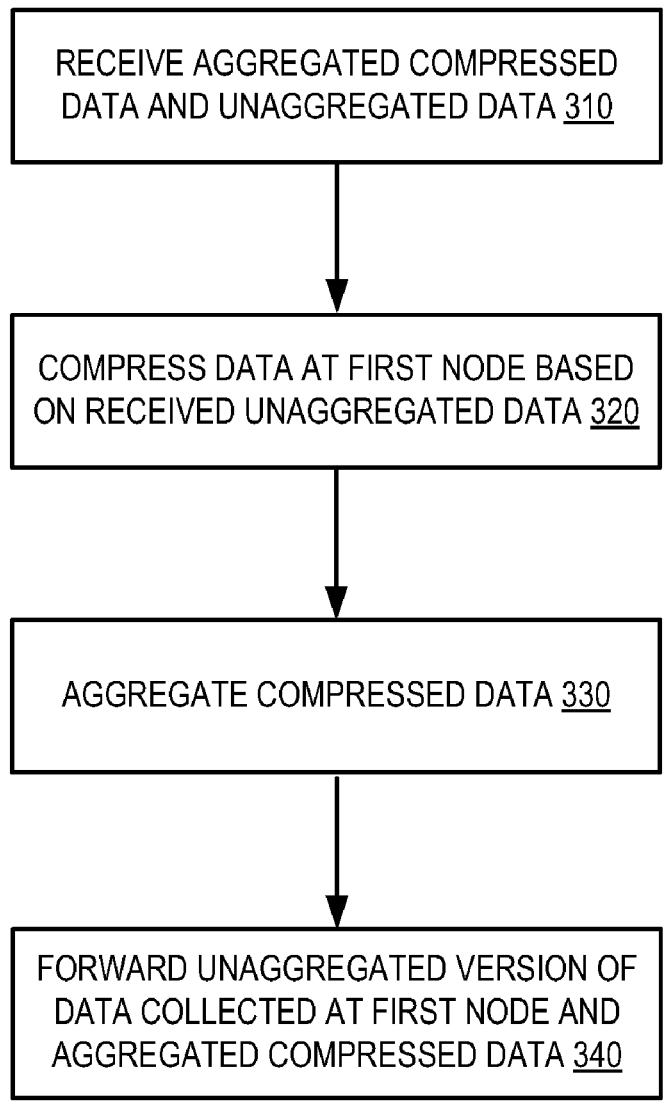
FIG. 3 is a flow diagram of operation in a system according to various embodiments.

FIG. 3 is a flow diagram of operation in a system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

A first node receives 310 both aggregated compressed data and unaggregated data from a second node in a wireless multi-hop network. The aggregated compressed data may be an aggregate of data compressed at various hops along the path in the multi-hop network. The unaggregated data may be data (e.g., uncompressed data, lightly compressed data, etc.) from the immediate upstream neighbor node (e.g., the second node) or it may be derived from a group of neighboring nodes.

The received unaggregated data is used to compress 320 data collected or obtained by the first node. For example, the node may be a sensor node that collects sensor data such as temperature, wind, seismic activity, etc. In some embodiments, the node may be communicatively connected to a sensor that collects sensor data. Received unaggregated data is used to create a model of statistical dependencies between data samples (e.g., between samples from different node locations, samples taken at different times, etc.) in the form of a conditional probability distribution. The model (or models) may be used to code the data with an appropriately matched code, or to generate an estimate (e.g., an average value) of the sample(s) to be compressed and code the difference between the sample and its estimate (e.g., a Golomb code for differential compression).

Statistical dependencies between the raw data from which the received unaggregated data was formed and the local sensor data can be determined at the receiving node or prior to being sent to the receiving node. In particular, the raw data may be statistically dependent in more than one dimension (e.g., in time, space, etc.). For example, the raw data may have temporal dependencies. In other words, data samples taken periodically may have only a small variance from one sample period to the next. This small variance can be leveraged to differentially compress data, thereby reducing the number of bits needed to represent the data in compressed form. The raw data may also have spatial dependencies. In other words, data samples taken at neighboring nodes (e.g., at approximately the same time) may similarly have only a small variance between them. Again, the small variance could be leveraged to differentially compress data. In various embodiments, data that is correlated (e.g., has statistical dependencies) in multiple dimensions (e.g., time, space, etc.) may be more efficiently compressed by exploiting these multi-dimensional correlations in the compression algorithm.

Having compressed the local sensor data, the node may also preserve, perhaps just temporarily, the local sensor data in uncompressed form. The node then aggregates 330 the locally compressed data with the compressed data received previously. The node proceeds to forward 340 the aggregated compressed data along with some version of the local data (unaggregated data) to a next hop in the network. The aggregated compressed data is forwarded from hop to hop until a final destination (e.g., a processing station) is reached. The unaggregated data may only be forwarded once (i.e., to the next hop) to facilitate compression of sensor data collected at the next hop node, after which the unaggregated data may be stored or discarded by the next hop node.

Various components, modules, etc. described herein may be a means for performing the functions described herein.

The invention claimed is:

1. A method for compressing data, comprising:
    receiving aggregated compressed data and unaggregated data at a first node from a second node in a wireless multi-hop network;
    compressing data collected by the first node based on the unaggregated data;
    aggregating the compressed data collected by the first node with the aggregated compressed data received from the second node; and
    forwarding an unaggregated version of the data collected by the first node and the aggregated compressed data aggregated at the first node to a next hop in the wireless multi-hop network.

2. The method of claim 1, wherein the data is sensor data collected via sensors on respective nodes in the wireless multi-hop network.

3. The method of claim 1, wherein compressing data comprises:
    differentially compressing data at the first node based on the unaggregated data.

4. The method of claim 3, wherein the unaggregated data received from the second node comprises:
    uncompressed data collected by the second node; or
    an average of uncompressed data for multiple neighbor nodes.

5. The method of claim 1, wherein compressing data comprises:
    compressing data collected by the first node via state-dependent entropy coding based on the unaggregated data.

6. The method of claim 5, wherein the compressing further comprises:
    modeling temporal dependencies between uncompressed data samples collected by the first node;
    modeling spatial dependencies between uncompressed data collected by the first node and data collected by the second node received in unaggregated form;
    compressing the uncompressed data collected by the first node in view of the temporal dependencies and the spatial dependencies and in view of encoder state information received from the second node.

7. A wireless sensor node, comprising:
    a receiver to receive aggregated compressed data and unaggregated data from a neighbor node in a wireless multi-hop network;
    a data compressor to compress data collected by the sensor node based on the unaggregated data received from the neighbor node;
    an aggregation module to aggregate the compressed data collected by the sensor node with the aggregated compressed data received from the neighbor node; and
    a transmitter to forward an unaggregated version of sensor data collected by the sensor node along with the aggregated compressed data aggregated at the sensor node to a next hop in the wireless multi-hop network.

8. The wireless sensor node of claim 7, further comprising:
    a statistical dependence module to create a model of statistical dependencies between sensor data samples.

9. The wireless sensor node of claim 8, wherein the statistical dependence module further comprises:
    a temporal dependence module to model temporal dependence between sensor data samples; and
    a spatial dependence module to model spatial dependence between sensor data samples.

10. The wireless sensor node of claim 7, the data compressor further to differentially compress data collected by the sensor node in view of the unaggregated data received from the neighbor node.

11. The wireless sensor node of claim 7, wherein the wireless multi-hop network is multi-dimensional.

* * * * *